Figure 6:
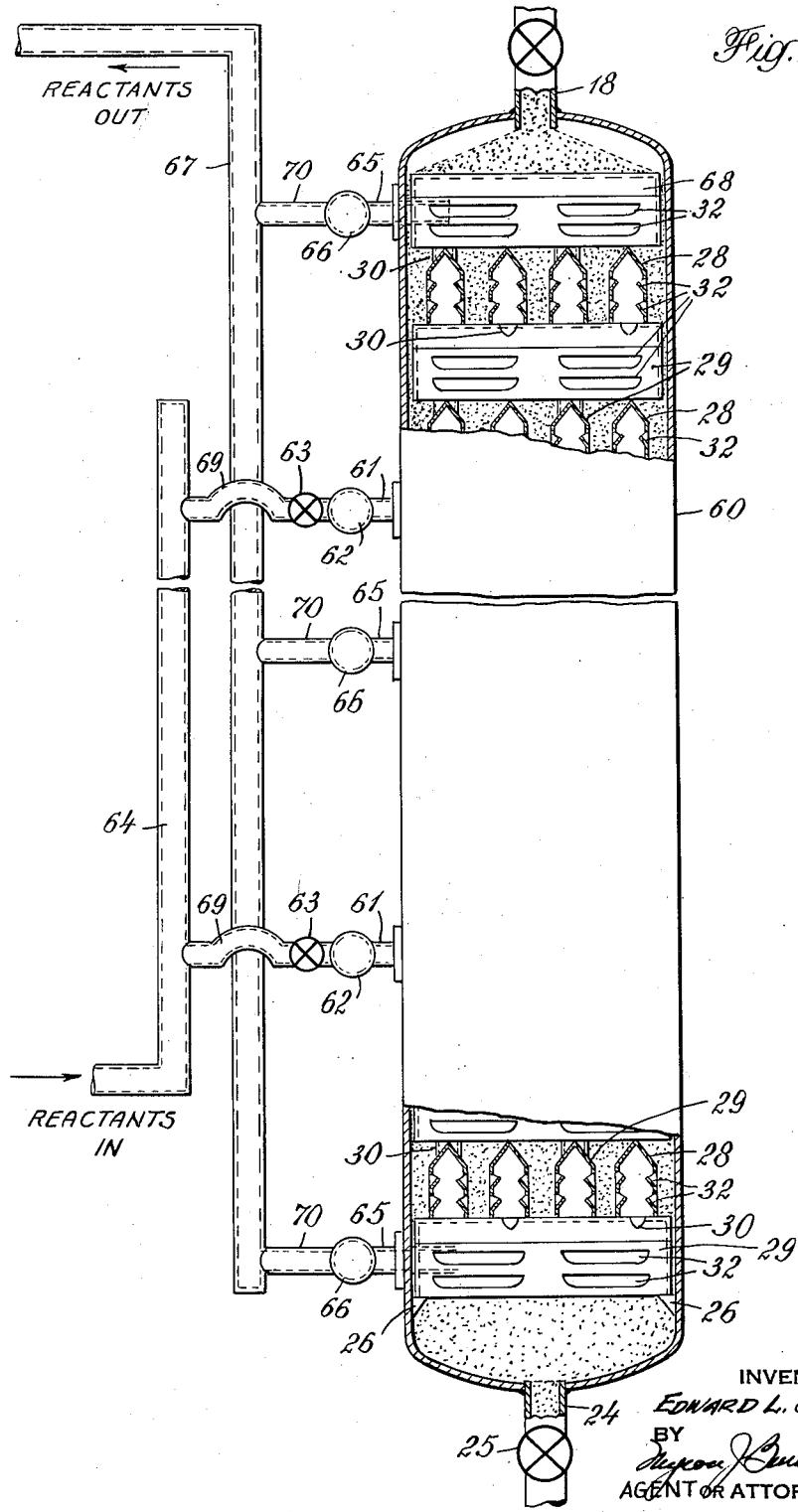

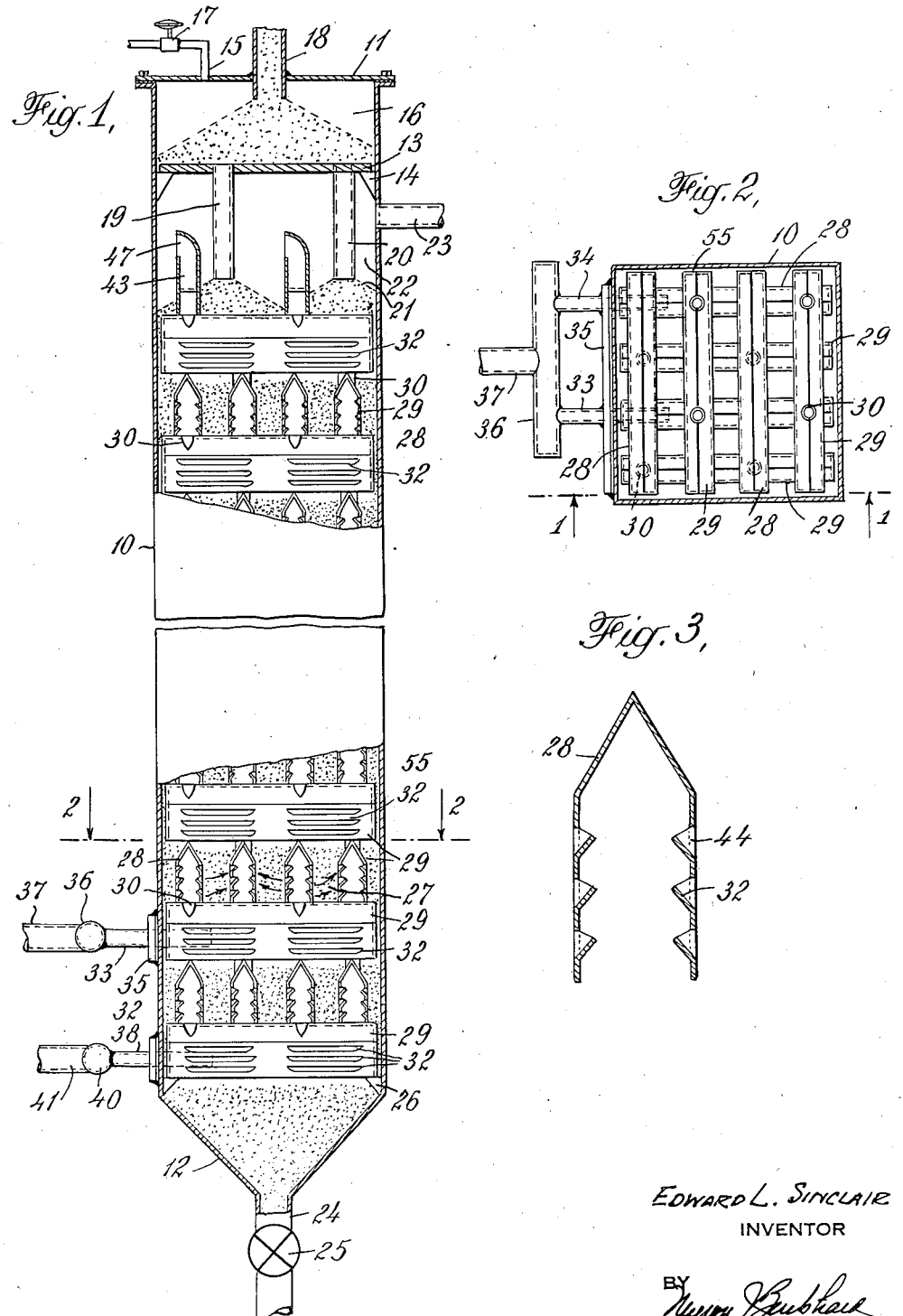

Jan. 25, 1949.    E. L. SINCLAIR    2,460,151
APPARATUS FOR GAS-SOLID CONTACT OPERATIONS
Filed June 9, 1944    3 Sheets-Sheet 2
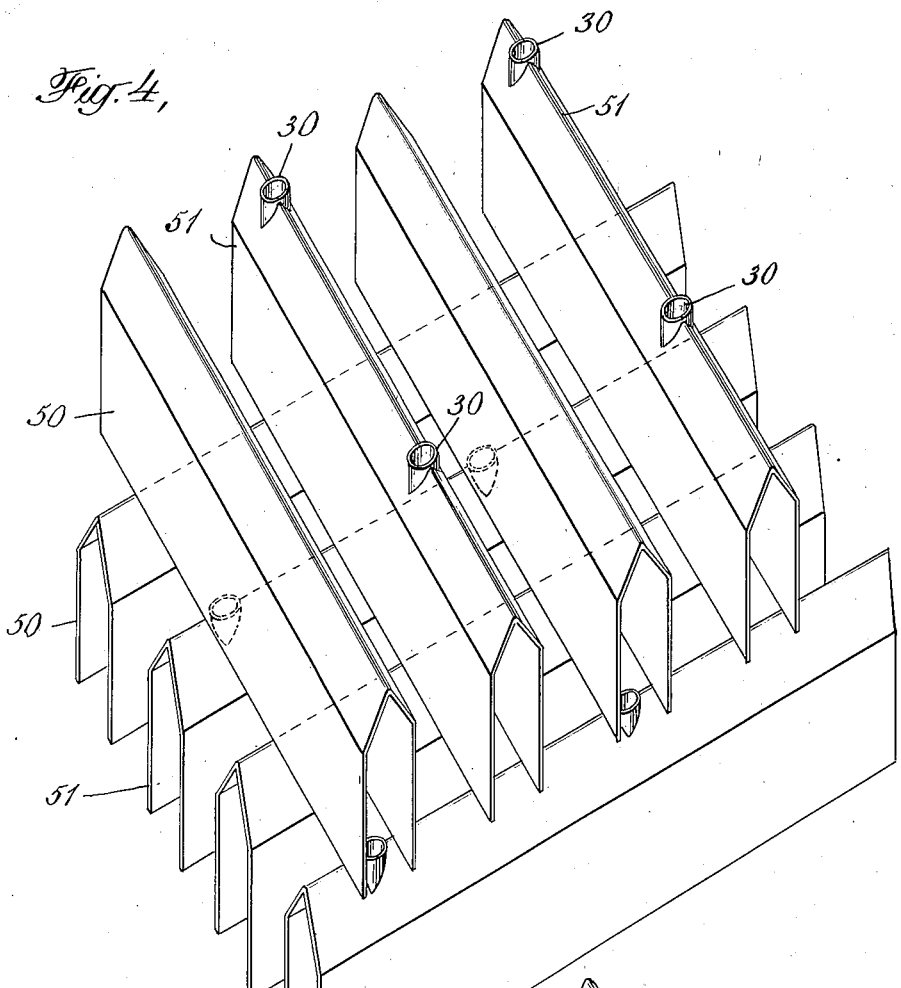
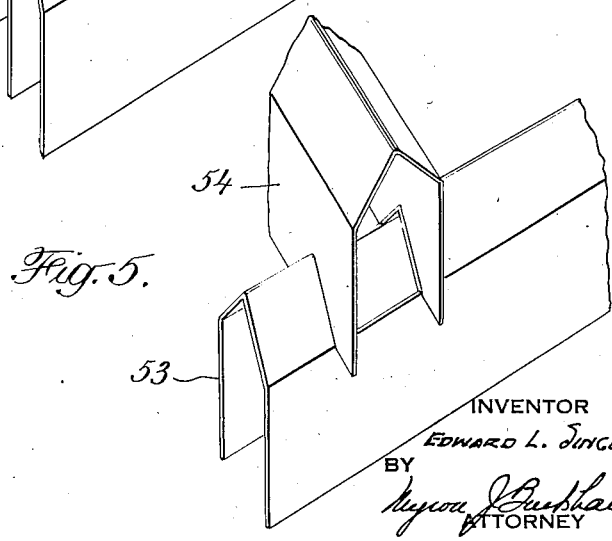
INVENTOR
EDWARD L. SINCLAIR
BY
ATTORNEY Patented Jan. 25, 1949

2,460,151

UNITED STATES PATENT OFFICE 2,460,151

APPARATUS FOR GAS-SOLID CONTACT OPERATIONS

Edward L. Sinclair, Haverford Township, Delaware County, Pa., assignor to Socony-Vacuum Oil Company, Incorporated, a corporation of New York Application June 9, 1944, Serial No. 539,474

10 Claims. (Cl. 23—288)

This invention has to do with an apparatus wherein a gaseous material may be contacted with a particle form solid material for any of a number of purposes such as adsorption, gas-solid heat exchange, solid or gas treatment or gaseous conversion. In processes involving gaseous conversion the solid material may be catalytic in nature; such processes have become increasingly important in the petroleum industry. Exemplary of such catalytic processes are the catalytic cracking, conversion, dehydrogenation, hydrogenation, isomerization, alkylation, reforming, polymerization, desulphurization and oxidation of hydrocarbon fractions. Typical is the cracking conversion of hydrocarbon gas oils, it being well known that gas oils boiling in the range of 450° F. to 750° F. may be converted to gasoline and other products when contacted with a particle form solid contact mass material at controlled conditions of temperature such as 800° F. and higher and pressure such as atmospheric and higher. The solid contact mass material for this process may partake of the nature of natural or treated clays or synthetic associations of silica, alumina or silica and alumina, which may contain certain added constituents such as certain metallic oxides. Generally a contaminant material is deposited upon the particle form solid material during the gaseous conversion resulting in a gradual decrease in the catalytic activity of the solid material for the gaseous conversion. Consequently, it is necessary to periodically regenerate the solid material which is usually accomplished by burning the contaminant deposit therefrom at elevated temperatures. Commercially, hydrocarbon conversion processes of the type involving contact of hydrocarbon with a substantially compact column of particle form catalyst have taken two broad forms. First, those in which the catalyst is held in situ in a conversion vessel and subjected alternately to periods of gaseous conversion and contaminant burning. Second, those wherein the particle form solid material is cyclically passed as a substantially compact column through two vessels, in one of which it is contacted with hydrocarbon gases for the purpose of their conversion and in the others of which it is contacted with a combustion supporting gas for the purpose of burning the contaminant deposited upon the solid material during the conversion step.

This invention is specifically directed to apparatus construction for directing and distributing the gas flow in processes of the type above described.

Proper utilization of contact masses in such processes requires a rather complete diffusion of gaseous reactants into the contact mass. It also requires the capability of passing comparatively large volumes of gaseous reactants through the apparatus without undue pressure drop. In former designs, it usually has been found necessary to sacrifice one of these desirable features to some extent in favor of the other. For example, in a process wherein the reactants were passed through a relatively deep bed of contact mass, limitation of reactant space velocity was necessary both in order to avoid undue pressure drop and also to avoid space velocities at which the carrying effect of the reactant gas would be such as to bring about "boiling" of the contact mass with consequent channeling and ineffective utilization. When some form of structure was utilized which presented a sufficient amount of voids distributed throughout the contact mass to avoid undue pressure drops it became difficult to secure good diffusion of reactant gases into the contact mass. A further problem arose in the difficulty in providing a practical means for insuring uniform and equal contact of all portions of the contact mass with the gaseous reactants.

A major object of this invention is the provision of an apparatus wherein relatively large volumes of contact gas may be passed uniformly through substantially all portions of a confined column of particle form solid material without causing substantial disruption of said column of solid material.

A specific object of this invention is the provision in a conversion vessel adapted to confine a substantially compact column of particle form solid contact mass material, of means for accomplishing a high space velocity flow of gaseous reactants through the solid material mass without substantial disruption thereof by said gas flow.

Before entering into a description of the invention, attention should be given to certain terms which are used both in describing and in the claiming of this invention. One of such terms is the term "gas" which is intended herein as meaning material in the gaseous phase at the temperature and pressure of the operation regardless of the normal phase of such material at atmospheric conditions. Another term is the term "contacting gas" or "contact gas" which is intended as broadly meaning any gas which may be desirably contacted with a particle form solid material, regardless of the purpose of such contacting.

For a better understanding of this invention, reference should now be made to the figures attached hereto, of which Figure 1 is an elevational view, partially in section, of a conversion vessel constructed according to this invention, Figure 2 is a plan view, partially in section, taken at line 2—2 in Figure 1, Figure 3 is a sectional view of one of the gas passage trough members shown in Figure 1, Figure 4 is an isometric view showing a stacking arrangement of such trough members, Figure 5 is an isometric view showing modified trough members and Fig. 6 is a modified form of the apparatus. All of these drawings are highly diagrammatic in form.

Turning now to Figure 1, we find an apparatus constructed according to this invention and specifically adapted for use in a gaseous conversion process such as the catalytic conversion of hydrocarbons. In Figure 1, 10 represents the shell of the conversion vessel closed on its upper end by top 11 and on its lower end by a tapered drain section for solid material 12. A partition 13 is supported across the vessel shell by support members 14 in the upper section of the vessel, thereby providing a seal chamber 16 within the upper end of said vessel. A pipe 15 having diaphragm valve 17 thereon is connected into the top of the seal chamber for introduction of seal gas, as shown hereinafter. A conduit 18 is connected through top 11 for introduction of particle form solid material into the seal chamber. Uniformly spaced pipes, such as 19 and 20 connect through and depend from the partition 13 and terminate a vertical interval therebelow at the surface 21 of the column of particle form solid material maintained within the vessel. A gas space 22 is thus provided above said column and directly below said partition, from which gas space the direct flow of solid material from seal chamber 16 is excluded. An outlet conduit 23 is provided in the vessel shell adjacent the upper end of the gas space 22. A drain conduit 24 having valve 25 thereon is suspended from the lower end of the drain section 12 at the bottom of the vessel. Supported within the vessel by the support brackets 26 are a plurality of superimposed rows of horizontally extending inverted trough members, the trough members in any given row being parallel and being spaced horizontally apart so as to provide a passageway 27 of substantial width therebetween for flow of the particle form solid material. In the arrangement shown the trough members are of two types, alternate troughs 28 in any given row having solid gabled tops along their length, the remaining alternate troughs 29 having similar gable tops along their length but having openings or ports 30 at spaced intervals along said gabled tops. Troughs in adjacent rows are positioned horizontally at 90 degrees with each other and the openings in the tops of the alternate troughs 29 are so spaced as to be covered by trough members in the row thereabove of the type 28 having no openings in their tops. The trough arrangement is therefore such that alternate rows are substantially identical as regards position and arrangement of troughs and adjacent rows differ in that the troughs cross at 90 degrees to each other. End plates 55 are provided on the ends of the troughs to prevent flow of solid material thereunder from the ends. Louvers 32 are provided in the sides of the troughs, the louvers being of such construction, as hereinafter explained, as to permit flow of gas and prevent flow of solid material therethrough.

The arrangement of the troughs and the arrangement of the gas inlet header may be better understood by reference to Figure 2 in conjunction with Figure 1. Figure 2 is a plan view, partially in section, taken along line 2—2 in Figure 1, which line is shortly above the main gas inlet row.

Referring now to Figures 1 and 2 wherein like members bear like numbers, we find inlet pipes 33 and 34 welded to and passing through plate 35 which in turn is welded to the vessel shell near the lower end thereof. The pipes 33 and 34 extend under the alternate trough members 28 having no openings in their tops; said troughs being members of a row thereof in the lower section of the vessel. The pipes 33 and 34 connect on their external ends into manifold 36 to which is connected the main gas inlet conduit 37. Similarly at the level of the lowermost row of troughs, gas inlet pipes 38 and 39 are provided under trough members 28, the pipes 38 and 39 connecting into the manifold 40 into which an inlet conduit 41 also connects. In the upper part of the vessel gas outlet ducts are positioned, across the uppermost row of trough members, said outlet ducts comprising channel members along the tops of which outlet risers are spaced at set intervals. These outlet ducts are so positioned as to cover the openings in the roofs of trough members 29 in the top row of troughs thereby providing confined passages for gas flow from under the uppermost trough members 29 to the gas space 22 above the surface of the solid material column in the vessel.

Considering, as a typical example, the operation of the above described apparatus as a reactor for conversion of hydrocarbons, particle form solid catalytic material passes through the conduit 18 into the seal section 16 against the pressure therein. The conduit 18 is of sufficient vertical height to provide for a head of solid material therein sufficient to overcome the gaseous pressure head in the seal chamber 16. The solid material accumulates in the seal chamber and passes from the bottom of the accumulation through pipes 19 and 20 to the surface 21 of the column of said solid material maintained within the vessel. The solid material then passes uniformly downward through the vessel as a substantially compact column, passing through spaces 27 between trough members; and the solid material finally passes from the vessel through drain conduit 24. The rate of solid material flow through conduit 24 is controlled by throttle valve 25 both in order to maintain a column of solid material within the vessel and in order to control the time of contact of the solid material with conversion gases. The solid material withdrawn through conduit 24 may bear a carbonaceous contaminant deposit, so it is then passed through a suitable regenerator, not shown, wherein the contaminant may be removed. Regenerated solid material may then be returned to the top of the conversion vessel. Hydrocarbon vapors heated to the desired reaction temperature in a suitable apparatus (not shown) which may be of conventional design, pass through conduit 37 into manifold 36 and thence through inlet pipes 33 and 34 under the trough members 28, having solid gable tops. The reactant gas then distributes itself under the troughs 28 along their entire lengths and then passes from under the troughs 28 and also through the openings 44 provided by louvers 32 in their sides into the solid material in the spaces 27 and therethrough to adjacent troughs 29, having openings along their tops. The gas enters the space under these troughs by way of the opening thereunder and through their louvered sides and then passes up through the openings in the tops of said troughs discharging under troughs in the next row above having tops without openings. The gas then passes through a similar flow cycle for the row above and repeats it for every row on up the conversion vessel. It should be noted that not all the gas issuing from under a given trough member 28 passes through the flow path outlined above. Part of the gas entering the solid material in spaces 27 will pass directly upward through the solid material to trough members in the row above, especially those trough members having openings in their tops. The relative amounts of gas flowing thus upwardly, through the solid material as compared with that flowing horizontally at any given row is largely dependent upon several factors to be discussed hereinafter. Upon reaching the uppermost row of troughs, the gas passes into the duct members 43 and up through their risers issuing through openings 47 into the gas space 22. Entrained solid material may separate from the gas in the space 22; and the effluent gaseous reaction products pass from said space through outlet conduit 23. The effluent gaseous products may then pass to a suitable product recovery system (not shown). An inert purge gas, such as steam or flue gas is introduced by way of conduit 41, manifold 40 and inlet pipes 38 and 39 under trough members 28 having closed tops, said trough members being in the lowermost row of the vessel. Most of the purge gas works its way upwardly through the vessel in a manner similar to that above described for reactant gases and passes from the vessel along with the gaseous reaction products, and a small amount of the purge gas may escape through conduit 24 along with the solid material. The purge gas thus serves two functions, one to purge reactant gases from the solid material below the reaction zone before its passage from the vessel and two, to prevent substantial loss of reactant gases from the bottom of the vessel. An inert seal gas, such as steam or flue gas is introduced into the seal chamber 16 through pipe 15. The quantity of seal gas so introduced is regulated by diaphragm valve 17 on pipe 15, which valve is actuated by a suitable differential pressure control instrument (not shown) so as to maintain a seal gas pressure in the chamber 16 above the gaseous pressure in gas space 22, thereby preventing loss of reactant gases through the solid material feed conduit 18.

Referring now to Figure 3 for a more detailed study of the trough members, we find in Figure 3 a sectional elevational view of one of the trough members 28 having a closed top. Louvers 32 are provided in the sides of the trough member, the louvers being of such construction as to provide openings 44 which may be larger than the particle diameter of the solid material involved in the operation, but through which substantially no solid material particles will flow by normal gravity flow.

The use of louvers in the sides of the trough members is a preferable form of this invention since such louvers permit increased rates of gas throughput without substantial disruption of the solid material column. In lieu of louvers other types of openings may be provided in the side walls of the troughs. Thus the walls may be perforated with a number of holes smaller in diameter than the solid material particles, but since such holes tend to become plugged with particles of solid material, their use is less preferable than that of louvers. For certain operations and certain shapes of trough members, the louvers may preferably be omitted. Figure 4 is an isometric view showing an assembly of two rows of trough members substantially identical to those shown in Figure 1, except that louvers in the trough side walls are omitted. It will be seen that each row consists of alternately positioned, parallel trough members 51, having openings in their tops and trough members 50 having no openings. It will also be seen that the openings in troughs 51 are covered by trough members 50 of the row directly above having no openings in their tops, thus providing a solid material free passage for gas flow from the level of one row to the row thereabove only after the gas has passed through the solid material passing between adjacent trough members 50 and 51 in any given row. As before stated, part of the gas may given row. As before stated, part of the gas may pass upwardly through the solid material from one row to the spaces under troughs having tops with openings in the row above. The relative amount of gas following this path of flow through the solid material as compared with that passing substantially horizontally across the column of solid material between adjacent troughs in any given row is dependent upon the relative magnitude of the distance between adjacent troughs 50 and 51 in any one row as compared with the distance from the nearest point of egress from the space under a trough 50 in any given row to the gas space under a trough 51 in the row thereabove. It has been found generally desirable to limit the former dimension below the latter so as to encourage horizontal gas flow which will permit more uniform and even contact of the solid material with the gas. Another factor is the size of the openings in the troughs 51, which is an indirect measure of the resistance to gas flow therethrough as compared with the resistance to gas flow between adjacent rows of troughs offered by the solid material column, which latter resistance is in turn a function of the solid particle size. The area provided by the openings in the tops of troughs 51 should be sufficient to limit the pressure drop due to gas flow therethrough substantially below that which would result from the flow of the same amount of gas through the solid material between two adjacent superimposed rows.

In order to better accomplish this for some trough arrangements, a construction such as that shown in Figure 5 may be used. In this figure an isometric view of a section of two superimposed troughs is shown. A sufficient section of the gable roof of the lower trough 53 is cut away to permit the covering trough 54 of the row above to fit into the opening and to rest directly upon the upper ends of the sides of trough 53. It will be apparent that when troughs are thus arranged or when troughs or channel having flat roofs are used, louvers, if provided, in the sides of the trough or channel members should be provided only in the lower sections of said sides, since otherwise excessive channeling of the gas directly up to the space under the covering troughs in the row above would result.

The height of the sides of the troughs, the spacing of troughs in the individual rows and the number of rows used may be varied depending upon the operation specifically involved. Thus for operations requiring very high gas space velocities (measured as volume of reactant throughput per hour per volume of catalyst in the reaction zone of the vessel) and relatively short lengths of gas path through the solid material, a relatively few rows of troughs having very high sides may be used. For such operations the height of the troughs may be of the order of approximately one to five feet, the nearest horizontal distance between adjacent, parallel troughs in any given row may be of the order of two to twenty-four inches and the number of superimposed rows will be sufficient to extend vertically through a column of solid material of the order of three to thirty feet in height. For cracking conversion of hydrocarbon gas oils a total length of gas path through the solid material from about 2 to 5 feet is considered preferable. A typical vessel for hydrocarbon cracking conversion at high space velocities may contain nine superimposed rows of troughs, the troughs each being about two feet high and two inches in width and adjacent troughs being spaced on approximately six inch centers. On the other hand, where lower space velocities and longer paths of gas flow are desired, a considerable number of superimposed rows of troughs of relatively short height may be used. In such operations the troughs may be of the order of four to twelve inches in height and may be spaced so that the nearest distance between sides of adjacent troughs is of the order of two inches to five feet.

When the troughs are stacked criss-crossed at 90 degrees, as shown hereinabove, only two types of rows result which are repeated throughout the vessel reaction zone. Other arrangements are also possible within the scope of this invention. Thus by simply adjusting the positions of the openings in the roofs of troughs having such openings, a stacking arrangement may be provided wherein four types of rows result. In this arrangement the trough members of alternate rows would pass horizontally across the vessel in their lengthwise direction but be horizontally offset in the other horizontal direction and the trough members of adjacent rows would cross at 90 degrees. Other modified arrangements are those wherein the trough members in adjacent superimposed rows cross each other at angles other than 90 degrees. Arrangements of the latter type are well adapted for vessels of hexagonal or octagonal or even circular cross sectional shape. The alternate arrangement of closed troughs and troughs having tops with openings therein in any row is a preferable arrangement in that it provides for uniform and even flow of gas through substantially all sections of the solid material column. Other arrangements of the two types of troughs in each row may be used within the scope of this invention, but less desirable operation will result.

Certain variations in other parts of the apparatus shown in Figure 1 may be desirable depending on its application. Thus, although the vessel shown in Figures 1 and 2 is of substantially square cross sectional shape, vessels of other shapes may be equally well used provided that the length or shape of the trough or channel members is adjusted to suit the cross-sectional shape of the vessel. Vessels of circular cross section are especially desirable when the gas-solid contacting operation is to be conducted under any substantial pressure above atmospheric, since such vessels may be constructed with greater strength than flat-sided vessels. Another variation may be in the method of solid material introduction to the conversion vessel; for example, a screw conveyor or star valve or system of locks might be employed. When escape of the contacting gas into the atmosphere is not objectionable, as in catalyst regeneration operations using air, the seal chamber 16 may be omitted. The vessel might even be open on top in such instance, provided suitable means is provided for introduction of solid material to the vessel below the level of the gas outlets from ducts 43. Likewise in such operations the provision for purging the solid material in the lower section of the vessel may be omitted. The manifolding and means for admitting inlet gases under the troughs may also be modified. Thus a manifold box may be provided along the side of the vessel adjacent the desired inlet row of troughs, and the manifold box may be placed in communication with the ends of the proper troughs by means of sleeves extending through the shell wall. The structure of the outlet ducts 43 may also be varied, thus individual vertical conduits may be connected to the tops of the proper trough members of the uppermost row directly over the openings in the roofs of said troughs. Moreover, gas may be introduced, as shown, under troughs having closed tops in a plurality of vertically spaced rows, and gas outlet means which may or may not be very similar to the inlet means may be provided under some or all the troughs, or over troughs having openings in their tops, in a second plurality of vertically spaced rows, the inlet and outlet rows alternating along the length of the vessel. In such an arrangement, the outlet duct members covering the openings in the tops of the uppermost row of troughs may be omitted and the uppermost row may consist of only troughs with closed tops. Such a multistage type of vessel will permit even higher total gas throughput rates than the types shown hereinbefore Such an apparatus is shown in Figure 6 wherein is shown a vessel 60 in which the channel packing is arranged similarly to that shown in vessel 10 of Figure 1, except that all of the channel members 68 in the uppermost row have closed tops. Like members bear like numerals as in Figures 1 and 6. In Figure 6 hydrocarbon reactants may be admitted through manifold 64 through conduits 69 to manifolds 62 from which it passes through pipes 61 into the vessel 60 at a plurality of spaced vertical levels. Gaseous reaction products may be withdrawn via pipes 65, manifolds 66, conduits 70 and outlet manifold 67 through which they are directed to a finishing system, not shown.

The apparatus of this invention may take the form of one wherein both the gas and solid material move through a reaction zone, as shown in the examples hereinabove, or it may take the form of one wherein only the gas flows, the solid material being maintained in place within the reaction zone as a substantially compact column of particle form material.

It will be apparent that by directing the gas flow through a series of relatively short beds of solid material between adjacent trough or channel members, which beds may offer a total cross-section for gas flow, substantially greater than the horizontal cross sectional area of the vessel itself, an apparatus is provided which will permit maintenance of much higher gas flow rates through a column of particle form solid material without substantial disruption of said column than are possible in current single pass vessels wherein the gas is passed upwardly through the length of the column of solid material. Moreover, the uniform spacing of the trough members throughout the column of solid material within the contacting zone, permits uniform distribution and flow of the gas through all sections of the solid material column, thereby making possible high utilization efficiency of the solid material and even and uniform treatment of the gas.

It should be understood that the drawings attached hereto depicting the invention and the description of both the apparatus of this invention and of the processes to which it may be applied are merely exemplary in character and are in no way intended to limit its scope except as it is limited by the following claims.

I claim:

1. In a gas-solid contact apparatus a plurality of superimposed rows of horizontally extending, inverted, spaced trough members, certain of said trough members in at least most of said rows having openings at spaced intervals in their tops, and the trough members in said superimposed rows being so arranged that said openings are covered by trough members in the row above, which trough members have closed tops, means to admit contact gas under trough members having closed tops in at least one of said superimposed rows, means to withdraw gas from trough members in at least one of said superimposed rows positioned at a spaced vertical interval from a gas inlet row.

2. In a gas-solid contact apparatus, a contacting vessel adapted to contain a column of particle form solid material, a plurality of criss-crossed superimposed rows of horizontally extending, inverted channel members, the channel members in any given row being parallel and horizontally spaced apart so as to provide space for a substantial bed of particle form solid material therebetween, and alternate channel members in each row having openings at spaced intervals in their tops, the openings being so spaced and the channel members in each row being so arranged that each of said openings is covered by a channel member in the row immediately thereabove, which channel member has a closed top, means to introduce contacting gas under the channel members having closed tops in at least one of said superimposed rows, means to withdraw gas from channel members having openings in their tops in at least one of said superimposed rows spaced at a vertical interval from a gas inlet row.

3. An apparatus for catalytic conversion of gaseous reactants comprising: a substantially vertical vessel closed on either end, passage confining means for introduction of solid material into said vessel at a level below the upper end thereof, thereby providing a gas space within the upper end of said vessel from which the solid material flow is substantially excluded, means to withdraw solid material from the lower end of said vessel, throttling means associated with said withdrawal means to permit control of the rate of withdrawal of said solid material so as to maintain a substantially compact column of said solid material within said vessel, a plurality of rows of superimposed criss-crossed inverted, horizontally extending trough members within said vessel, the trough members in any row being parallel and horizontally spaced apart so as to leave space for passage of solid material therebetween, and alternate trough members having openings in their tops at spaced horizontal intervals, the openings being so spaced and the trough members so arranged that said openings in the trough member tops of any given row are covered by trough members having closed tops in the row above, means to introduce reactant gas under trough members having closed tops in at least one of said rows within said vessel, duct members covering the openings in the tops of alternate troughs in the uppermost of said rows, said duct members extending upwardly into said gas space within the upper end of said vessel, means to withdraw gas from said gas space.

4. In a reactor for conducting conversions of hydrocarbons in the presence of a particle form solid material, a plurality of horizontal rows of superimposed, criss-crossed, inverted channel members, said channel members in any row being substantially parallel and horizontally spaced apart so as to provide a substantial space for particle form solid material therebetween, and said channel members having perforations along certain sections of their sides pervious to the flow of gas therethrough and impervious to flow of solid material particles therethrough, and certain of said channel members in at least most of said rows having openings at spaced intervals along their tops, the spacing of said openings and positioning of said channel members being such that said openings are covered by channel members in the row above, the covering channels being of the closed top variety, means to introduce hydrocarbon reactant gas under channel members having closed tops in at least one of said superimposed rows, means to withdraw gas from channel members of at least one of said superimposed rows positioned at a spaced vertical interval from an inlet row.

5. An apparatus for catalytic conversion of gaseous reactants comprising: a substantially vertical, closed vessel adapted for confining a substantially compact column of particle form solid catalytic material therein, means to introduce said solid material into said vessel to the level of the surface of said column within said vessel while substantially preventing the flow of said solid material into the gas space within said vessel above the surface of said column, means to withdraw solid material from the lower end of said vessel at a controlled rate so as to maintain said column therein, a plurality of superimposed, criss-crossed rows of horizontally extending inverted, gable topped channels, the channels in any row being substantially parallel and spaced apart so as to provide a passageway of substantial width for flow of said solid material therebetween, and said channels having louvres along their sides of such construction as to permit flow of gas therethrough into the solid material while preventing the flow of solid material particles therethrough, and alternate channels in each row having spaced openings in their gable tops, the opening being so spaced and the channels so positioned as to provide closed top channels over the openings in the open top channels in any row, means to introduce reactant gas under closed top channels in a row near the lower end of said vessel, passage defining members positioned vertically over the openings in the tops of channel members in the uppermost row, said passage defining members terminating in said gas space above the solid material column in said vessel, outlet means for gas flow from said gas space.

6. An apparatus for contacting gases with a particle form solid material comprising a substantially vertical vessel adapted to confine a column of particle form solid material, means to introduce particle form solid material into the upper section of said vessel, means to withdraw solid material from the lower end of said vessel, throttling means associated with said withdrawal means to permit regulation of the rate of solid material withdrawal so as to provide a substantially compact column of particle form solid material within said vessel, a plurality of superimposed, criss-crossed rows of inverted horizontally extending channel members, the channel members in any given row being parallel and horizontally spaced apart so as to provide for a substantial bed of solid material therebetween and alternate members having openings at spaced intervals along their tops, excepting the channel members in the uppermost row of channels, the openings being so spaced and the channel members so positioned that said openings in channel member tops in any row are covered by channel members of the row immediately thereabove having closed tops, means to introduce contacting gas under channel members having closed tops at a plurality of vertically spaced rows within said vessel, means to withdraw gas from under channels at a second plurality of vertically spaced rows, said gas outlet rows alternating in vertical position with said gas inlet rows.

7. An apparatus for conducting catalytic hydrocarbon conversions comprising a substantially vertical closed vessel, a partition across said vessel within the upper section thereof defining a seal chamber within the upper end of said vessel, means to introduce an inert seal gas into said seal chamber, means to introduce a particle form solid contact material into said seal chamber, uniformly spaced feed conduits depending from said partition and terminating a vertical interval therebelow, thereby providing passages for said solid material to the reaction zone of said vessel and providing a gas space within said vessel below said partition and above the lower end of said conduits, outlet means for solid flow from the lower end of said vessel, flow throttling means associated with said outlet to permit control of solid withdrawal so as to provide a substantially compact column of particle form solid material within said vessel, a plurality of superimposed, criss-crossed rows of horizontally extending, inverted trough members within said vessel extending through a major portion thereof below said solid material feed conduits, the through members in any given row being parallel and spaced apart so as to provide a passageway of substantial width for flow of said solid material therebetween, and alternate trough members having openings at horizontal intervals along their tops, the openings being so spaced and the trough members so arranged that said openings in the tops of trough members of any row are covered by trough members having closed tops in the row immediately above, inlets for introduction of purge gas under trough members having closed tops in the lowermost row, inlets for introduction of hydrocarbons under trough members having closed tops in a row above said lowermost row, ducts covering the openings in the tops of trough members having such openings in the uppermost row, said ducts extending vertically upward and terminating in said gas space, gas outlet means from said vessel near the upper end of said gas space.

8. Apparatus according to claim 5 characterized in that the spacing of said channels in any row is such that the distance between adjacent parallel channels in any row is less than the distance between the uppermost louvres in the sides of said channels and the nearest boundary of the gas spaces under the channels crossing in the row directly thereabove.

9. In a reactor for conducting gaseous conversions in the presence of a particle form solid contact mass material; a plurality of superimposed rows of sloping roofed inverted channel members, said channel members in any row being substantially parallel and horizontally spaced apart so as to provide a space for particle form solid material therebetween substantially less in width than the height of said channel members, and said channel members having foraminate sides, the foraminations permitting passage of gas and substantially preventing passage of solid material particles through the sides of said channels, and alternate channel members in any row having openings at spaced intervals in their sloping roofs, the spacing of said openings being such that they are covered by channel members in the row thereabove extending horizontally at an angle with the row of channels below, which covering channel members are of the alternate variety having closed roofs, gas inlet means to underside of channels having closed roofs in at least one of said rows, gas outlet means from channel members of at least one of said rows vertically spaced from an inlet row.

10. An apparatus for conducting conversion of hydrocarbons in the presence of a particle form solid contact mass material comprising: a substantially vertical vessel closed at either end and adapted to confine a column of particle form solid contact mass material, a plurality of superimposed rows of inverted channel members positioned within said vessel throughout a major portion of its length, the channel members in any given row being parallel and extending horizontally across said vessel at angles with channels in rows thereabove and therebelow and the channel members in any given row being horizontally spaced apart so as to provide a substantial space therebetween for the particle form solid material, and alternate channel members in any given row, excepting the uppermost row of channel members, having openings at spaced intervals in their tops, the openings being so spaced that they are covered by channel members of the row thereabove, which covering channel members have closed tops, louvres along the lower sections of the side of said channel members, said louvres being such as to permit flow of gas through the sides of said channel members while preventing the gravity flow of solid material particles therethrough, means to introduce hydrocarbon reactant gas under channel members having closed tops in a plurality of vertically spaced rows within said vessel, means to withdraw gaseous reaction products from under channel members in a second plurality of vertically spaced rows, said latter rows being positioned at vertical levels within said vessel alternating with the levels of said gas inlet rows.

EDWARD L. SINCLAIR.

REFERENCES CITED

The following references are of record in the file of this patent:

UNITED STATES PATENTS

| Number | Name | Date |
|---|---|---|
| 1,852,277 | Barstow et al. | Apr. 5, 1932 |
| 2,183,301 | Bossner et al. | Dec. 12, 1939 |
| 2,226,578 | Payne | Dec. 31, 1940 |
| 2,367,281 | Johnson | Jan. 16, 1945 |
| 2,410,309 | Simpson et al. | Oct. 29, 1946 |
| 2,417,393 | Evans | Mar. 11, 1947 |

FOREIGN PATENTS

| Number | Country | Date |
|---|---|---|
| 645,654 | France | July 3, 1928 |

Certificate of Correction

Patent No. 2,460,151. January 25, 1949.

EDWARD L. SINCLAIR

It is hereby certified that error appears in the printed specification of the above numbered patent requiring correction as follows:

Column 11, line 44, claim 7, for the word "through" read *trough*;

and that the said Letters Patent should be read with this correction therein that the same may conform to the record of the case in the Patent Office.

Signed and sealed this 7th day of June, A. D. 1949.

[SEAL]

THOMAS F. MURPHY,
*Assistant Commissioner of Patents.*